(12) United States Patent
Nayak et al.

(10) Patent No.: US 11,792,457 B1
(45) Date of Patent: Oct. 17, 2023

(54) AUTOMATED PREDICTIVE CONTENT AVAILABILITY STRATEGY PROVISIONING

(71) Applicant: Amazon Technologies, Inc., Seattle, WA (US)

(72) Inventors: Vishwanath Nayak, Issaquah, WA (US); Justin Key, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 496 days.

(21) Appl. No.: 16/712,107

(22) Filed: Dec. 12, 2019

(51) Int. Cl.
| | |
|---|---|
| *H04N 21/24* | (2011.01) |
| *H04N 21/442* | (2011.01) |
| *H04N 21/4627* | (2011.01) |
| *H04N 21/239* | (2011.01) |
| *H04N 21/45* | (2011.01) |
| *H04N 21/466* | (2011.01) |
| *H04N 21/25* | (2011.01) |
| *H04N 21/262* | (2011.01) |

(52) U.S. Cl.
CPC ..... *H04N 21/2407* (2013.01); *H04N 21/2396* (2013.01); *H04N 21/2408* (2013.01); *H04N 21/25* (2013.01); *H04N 21/262* (2013.01); *H04N 21/26241* (2013.01); *H04N 21/44204* (2013.01); *H04N 21/4524* (2013.01); *H04N 21/466* (2013.01); *H04N 21/4627* (2013.01)

(58) Field of Classification Search
None
See application file for complete search history.

(56) References Cited

U.S. PATENT DOCUMENTS

| | | | | |
|---|---|---|---|---|
| 8,510,453 | B2 * | 8/2013 | Kunjithapatham | ... G06F 16/907 705/26.1 |
| 9,137,557 | B1 * | 9/2015 | Sandoval | ............. H04N 21/812 |
| 10,165,315 | B2 * | 12/2018 | Epstein | ............ H04N 21/25891 |
| 2003/0130887 | A1 * | 7/2003 | Nathaniel | ................ H04L 67/62 348/E7.063 |
| 2006/0211369 | A1 * | 9/2006 | Steelberg | .......... H04N 21/25891 455/3.06 |
| 2008/0249961 | A1 * | 10/2008 | Harkness | .......... H04N 21/44224 707/999.005 |
| 2009/0235364 | A1 * | 9/2009 | Cohen | ..................... G11B 27/28 726/28 |
| 2012/0079517 | A1 * | 3/2012 | Yarvis | ................. H04N 21/4532 725/14 |
| 2012/0311649 | A1 * | 12/2012 | Patten | .................... G06Q 30/02 725/97 |
| 2014/0282656 | A1 * | 9/2014 | Belyaev | ............. H04N 21/4751 725/59 |

(Continued)

*Primary Examiner* — Ricky Chin
(74) *Attorney, Agent, or Firm* — Eversheds Sutherland (US) LLP

(57) ABSTRACT

Techniques for predicting content availability strategies for content on a content service platform are provided. One technique includes identifying at least a first content item associated with a content provider to make available to one or more users over a communication network. One or more attribute measures of the first content item associated with user interaction with the first content item are determined. An availability framework for the first content item that satisfies one or more predetermined conditions is determined, based on an evaluation of at least the one or more attribute measures. An indication of the availability framework is provided to the content provider.

19 Claims, 6 Drawing Sheets

(56) References Cited

U.S. PATENT DOCUMENTS

| | | | | |
|---|---|---|---|---|
| 2014/0310745 | A1* | 10/2014 | Canney | H04N 21/2221 725/34 |
| 2015/0067754 | A1* | 3/2015 | Wiser | H04N 21/64738 725/120 |
| 2015/0172731 | A1* | 6/2015 | Hasek | H04N 21/26258 725/28 |
| 2016/0117719 | A1* | 4/2016 | Hood | G06Q 30/0273 705/14.42 |
| 2016/0360289 | A1* | 12/2016 | Santoro | H04N 21/84 |
| 2016/0373793 | A1* | 12/2016 | Meyer | G06Q 30/0241 |
| 2017/0034593 | A1* | 2/2017 | Ray | H04N 21/812 |
| 2017/0064395 | A1* | 3/2017 | Chaar | H04N 21/812 |
| 2017/0070789 | A1* | 3/2017 | Liassides | H04N 21/262 |
| 2017/0127110 | A1* | 5/2017 | Chaar | H04H 60/31 |
| 2017/0193547 | A1* | 7/2017 | Berrett | G06Q 30/0244 |
| 2017/0195747 | A1* | 7/2017 | Haberman | H04N 21/4532 |
| 2018/0084308 | A1* | 3/2018 | Lopatecki | H04H 60/82 |
| 2018/0189826 | A1* | 7/2018 | Xu | G06Q 30/0254 |
| 2018/0316957 | A1* | 11/2018 | Chaar | H04N 21/812 |
| 2020/0344307 | A1* | 10/2020 | Livshits | H04N 21/25825 |
| 2021/0136461 | A1* | 5/2021 | Sullivan | H04N 21/4532 |

* cited by examiner

AUTOMATED PREDICTIVE CONTENT AVAILABILITY STRATEGY PROVISIONING

BACKGROUND

The present disclosure relates to an automated system for predicting content availability strategies (or frameworks) for provisioning content on a content service platform.

Content service platforms generally make content from multiple content providers (e.g., individual(s), video broadcaster(s), network studio(s), publisher(s), independent filmmaker(s), music recording artist(s)/singer(s), etc.) available to users over a communication network. For example, a user can access a content service platform(s) to view video content (e.g., movies, television shows, etc.) available from the content service platform(s), listen to audio content available from the content service platform(s), read written or electronic reader ("e-reader") content (e.g., books, magazines, etc.) from the content service platform(s), etc.

Content service platforms can make content accessible to users (e.g., via the content service platform) under a variety of different offer (or availability) types. In one example, a content service platform may allow users to access content under a streaming-based model (e.g., where the user can stream the content from the content service platform). In another example, a content service platform may allow users to access content under a rental-based model (e.g., where the user can access the content from the content service platform for a predefined period of time). In yet another example, a content service platform may allow users to access content under a purchase-based model (e.g., where the user can purchase content from the content service platform for unrestricted access to that content). Other example offer types include advertising ("ad")-supported models, channel subscription based models, etc. Additionally, for each offer type, content service platforms may compensate users using a variety of different value (or monetization) models (or frameworks), including, for example, fixed-fee based, percentage based, pay-for-performance based, etc.

Currently, content providers have to undergo a significant amount of effort in order to determine the manner (e.g., time, location, offer type, and value model) in which to make their content items available to users via content service platforms. In many cases, for example, a content provider generally has to perform complex market analysis to determine when (e.g., the time), where (e.g., which geographical regions), and how (e.g., which offer type/value model) to make content available to customers. Further yet, even when a content provider determines the manner in which to make content available to a content service platform, the content provider generally has to negotiate custom contract terms for their content and deliver content items on an individual basis in order to make their content accessible via the content service platform. These time consuming and complex conventional methods can impact the number of content providers that interact with the content service platform, which in turn can impact the amount of content that is accessible to users via the content service platform.

BRIEF DESCRIPTION OF DRAWINGS

Various embodiments in accordance with the present disclosure will be described with reference to the drawings, where like designations denote like elements.

DETAILED DESCRIPTION

Figure 1:
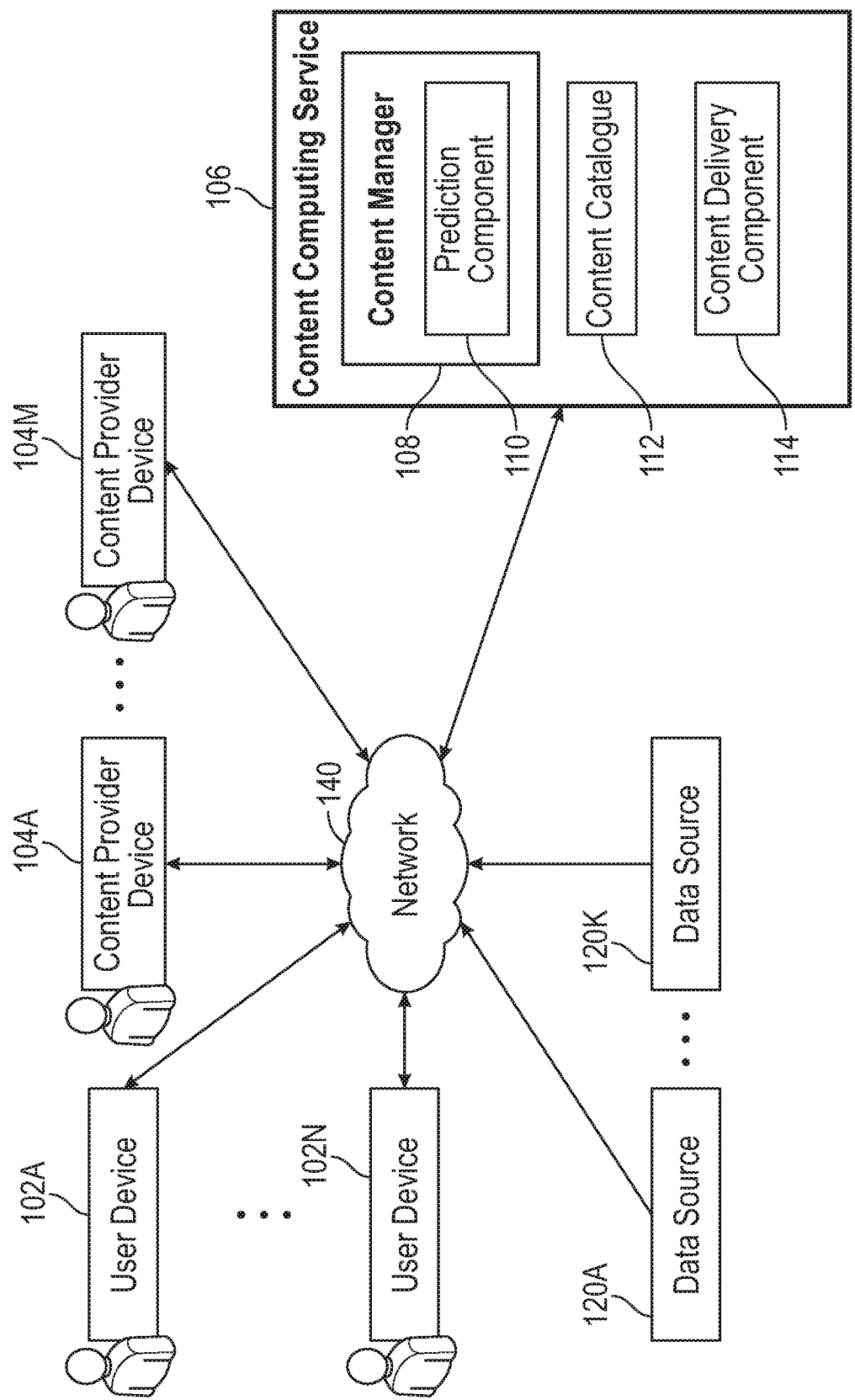
FIG. 1 is a block diagram illustrating an example of a computing environment providing a content service platform for delivering content over a network, according to one embodiment.

Content service platforms generally allow content providers to make their content available to users via a variety of different offer types and value models, e.g., in order to increase the amount of content that is available to users on the content service platforms. The content, for example, can include video content, audio content, electronic-reader ("e-reader") content, etc. The offer types (also referred to herein as access types or availability types) can include ad-supported models, rent models, purchase (or buy) models, streaming models, channel subscription models, etc. Similarly, for each offer type, content providers can be compensated based on a variety of different value models (also referred to herein as monetization models). The value models can include, but are not limited to, a fixed fee based model (e.g., an up-front payment), percentage based model (e.g., percentage of rental price, percentage of purchase price, etc.), pay-for-performance based model (e.g., payment based on how content performs on the content service platform), etc. Currently, content providers generally rely on complex market analysis to determine the manner (e.g., time, location, offer type, and value model) in which to make a given content item accessible to a content service platform. Additionally, content providers may have to resort to complex and inefficient methods in order to have their content made accessible to users via the content service platform.

For example, one conventional method for making content available to users via a content service platform involves negotiating custom contract terms on a deal by deal basis (e.g., for each video title, assuming the content is video content) and delivering that content in bulk to the content service platform. This conventional technique, however, is inflexible and can limit the number of content providers that interact with the content service platform, as some retailers (e.g., that own content service platforms) may be unwilling to license content up front, e.g., without knowing how the content will perform with users. Another conventional method for making content available to users via a content service platform involves licensing each content item (e.g., accepting fixed performance-based terms of the content service platform for each content item) and individually delivering (e.g., uploading) each content item to the content service platform. This conventional technique, however, can be operationally burdensome for content providers due to the amount of time and costs associated with title-by-title deal negotiations and title-by-title delivery, limiting the amount of content that a given content provider might be willing to make available to users via the content service platform.

As such, embodiments described herein provide techniques that enable a content service platform to determine or predict, for a given content provider, the availability strategy/framework (e.g., time, location, offer type, value model, etc.) in which the content provider should make their content available to users (e.g., customers) via the content service platform. The content service platform may determine, from multiple different availability strategies, the availability strategy that achieves a predefined condition for the content provider (e.g., a threshold amount of revenue generated for content, a threshold number of views, a threshold number of downloads, etc.).

In some embodiments, the content service platform can obtain and use information from a variety of sources for determining the availability strategy under which a content provider should make a given content item available on the content service platform. Examples of such information can include, but is not limited to, the set of content offered by a content provider, the content that is available from a content provider (e.g., including content that hasn't been offered by the content provider), performance data of content (e.g., number of streams, number of downloads, etc.) in different geographical regions, content metadata (e.g., content length, content description, content genre, etc.), market trends or conditions, content rankings, content ratings, content reviews, social media mentions of content, etc. The content service platform can evaluate one or more of the different types of information with one or more machine learning techniques and/or one or more statistical techniques/models to predict the performance of a content item against a combination of availability types offered by the content service platform and generate an availability strategy for the content item. The availability strategy, for example, can include the time period (e.g., the particular weeks, months, etc.), the geographical region (e.g., country, continent, etc.), offer type (e.g., streaming, rent, purchase/buy, ad-supported, channel subscription, etc.) and value model (e.g., fixed fee, percentage based, pay-for-performance based, etc.).

In some embodiments, the content service platform can determine an (updated) availability strategy for content of a content provider that is already accessible via the content service platform. For example, assume that a content item "x" (from content provider A) is currently accessible to users in country B, via the content service platform. In this instance, the content service platform can continually evaluate information regarding the performance of content item "x" (along with other information) in country B, and determine whether to update the availability strategy, based on the information. In some cases, for example, the content service platform may determine that updating the offer type for content item "x" to a rent-based model in country B will allow the content provider A to earn a larger amount of revenue (or, in general, satisfy a predetermined condition for the content provider A), relative to a streaming-based model. If the content service platform determines to update the availability strategy, the content service platform can provide an indication of the updated availability strategy to content providers, who can accept or reject the updated availability strategy. Assuming a content provider accepts the updated availability strategy, the content service platform can automatically update the content item's availability to user(s) of the content service platform (e.g., making it available in new countries, making it available under different offer types, etc.). In one embodiment, the content service platform may provide the indication in the form of an updated content detailed page, which is accessible to users via the content service platform. The content detailed page may indicate the different offer types, geographical regions, and times in which the content item can be accessed by users.

In some embodiments, the content service platform can determine an availability strategy for content of a content provider that is not currently accessible via the content service platform. For example, the content service platform may determine that a content provider (e.g., movie studio) owns a set of video titles and determine (or recommend) an availability strategy to the content provider for at least one of the video titles. The content service platform can recommend an availability strategy to the content provider that satisfies a predetermined condition (e.g., predicted to generate a threshold amount of revenue, etc.).

The content service platform may send an indication of the availability strategy for the content item(s) to the content provider. In one embodiment, the content service platform may present the availability strategy on a computing device (e.g., via a user interface) associated with the content provider. In this embodiment, the content service platform may enable the content provider to indicate, e.g., via the user interface, whether the content provider accepts the availability strategy. In some embodiments, upon receiving an indication that the content provider has accepted an availability strategy, the content service platform can automatically update a content catalog for the content service platform, based on the availability strategy (e.g., to reflect the availability strategy for the content item). Once updated, the content item can automatically be made available to users, e.g., accessing content via a user device, under the corresponding availability strategy. In this manner, embodiments provide an automated tool that enables content providers to make content available to users under flexible, performance-based value options, without having to negotiate title-by-title bespoke deals, or perform cost-prohibitive, time consuming market analyses.

Note that many of the following embodiments use video content as a reference example of a type of content that can be made available (e.g., hosted) on a content service platform. However, embodiments described herein can be used for a variety types of content (e.g., audio content, e-reader content, etc). Similarly, the following references a content service platform generally used to stream video content (e.g., sporting events, concerts, live events, movies, television shows, etc.). Such reference is used as an example content service platform that may determine the manner in which a content provider should make content available to users via the content service platform.

FIG. 1 is a block diagram illustrating a computing environment 100 providing a content service platform for delivering content over a network, according to one embodiment. As shown, the computing environment 100 includes a content computing service 106 (also referred to herein as a content service platform), one or more user devices 102 A-N, one or more content provider devices 104 A-M, and one or more data sources 120 A-K, each interconnected via a network 140. The network 140, in general, may be a wide area network (WAN), local area network (LAN), wireless LAN (WLAN), personal area network (PAN), a cellular network, etc. In a particular embodiment, the network 140 is the Internet. User devices 102 A-N are representative of a variety of computing devices, including a desktop computer, laptop computer, mobile computer (e.g., a tablet or smartphone), digital media player, video game console, smart television, etc. Similarly, content provider devices 104 A-M are representative of a variety of computing devices, such as a desktop computer, server computer, laptop computer, mobile computer, etc.

The content computing service 106 generally allows a content provider to make their content available to one or more users. In one embodiment, the content computing service 106 may be located in a cloud environment. As shown, the content computing service 106 includes a content manager 108, a content catalogue 112, and a content delivery component 114. The content catalogue 112 is generally a database that stores content items from one or more content providers. The content delivery component 114 is used to manage delivery of content from the content catalogue 112 to users (e.g., via user devices 102). In one embodiment, for example, the content delivery component 114 may enable users to stream and/or download content from the content catalogue 112. Although shown within the content computing service 106, the content catalogue 112 and/or the content delivery component 114 may be located elsewhere (e.g., within another network).

The content manager 108 provides an interface for the content provider to access the content computing service 106. For example, the content manager 108 may allow content providers to update the content items that are made available to users via the content computing service 106, allow content providers to view performance data (e.g., number of minutes streamed, ad impressions, purchases/rentals, number of geographical regions etc.) regarding their content items, allow content providers to view earnings and related payments for content items (e.g., via monthly earnings reports), indicate/update rights information for the content items, etc.

The content manager 108 can receive availability information from the content providers and validate/verify the availability information (e.g., to determine whether the content providers have rights to the indicated content items). In one embodiment, the availability information may include identifying information (e.g., serial numbers, content identifiers, etc.) associated with one or more content items. For example, assuming the content items are video titles, a content provider can submit a list of the titles (e.g., via an EMA Avails spreadsheet) using their stockkeeping units (SKUs). In other examples, the content provider can indicate the availability information for each content item individually or in bulk via an application programming interface (API) provided by the content manager 108. In some embodiments, the availability information may also include metadata (e.g., description information, such as type, genre, length, etc.) for the one or more content items, rights information for the one or more content items, preferences for offer types and value models for the one or more content items, etc. Additionally, the content manager 108 can enable content providers to send or upload their content for storage in the content computing service 106 (e.g., in the content catalogue 112). The content manager 108 may enable content providers to upload content individually or in bulk for storage in the content computing service 106 (e.g., in the content catalogue 112).

A content provider can use a content provider device 104 to access the content computing service 106. In one example, a content provider may access the content computing service 106 via a web browser on a content provider device 104. In another example, a content provider may access the content computing service 106 via an application executing on a content provider device 104. In these examples, the web browsers and/or applications on the content provider device 104 may directly interface with the content manager 108.

Similarly, users can access the content computing service 106 via user devices 102. In one example, a user may access the content computing service 106 via a web browser on a user device 102. In another example, a user may access the content computing service 106 via an application executing on a user device 102. In these examples, the web browsers and/or applications on the user device 102 may directly interface with the content delivery component 114. The content delivery component 114 may allow a user to search for (and/or request) different types of content and/or a given content provider, and access various content. In response to a request for a particular content item, the content delivery component 114 may deliver the content (e.g., via streaming, accepting a download request, etc.) to the users (e.g., via user devices 102).

As noted, with conventional methods, content providers may have to undergo a significant amount of effort in order to determine the optimal manner in which to make their content available to users via the content computing service 106. To address this, embodiments provide techniques and systems for predicting availability strategies under which content providers should make their content available to users. As shown, the content manager 108 includes a prediction component 110, which is configured to implement one or more techniques described herein for predicting content availability strategies for content items.

As described in more detail below, the prediction component 110 can generate an availability strategy for content item(s) of a content provider that satisfies a predetermined condition (e.g., achieves a threshold amount of revenue for that content item, achieves a threshold number of users that access (e.g., view) that content item, etc.) for the content provider. As noted, the availability strategy can include the time period (e.g., the particular weeks, months, etc.), the geographical region (e.g., country, continent, etc.), offer type (e.g., streaming subscription, rent, purchase/buy, ad-supported, channel subscription, etc.) and value model (e.g., fixed percentage, royalty based, up-front payment, etc.).

In one embodiment, the prediction component 110 can obtain information associated with the content item from a variety of different sources (e.g., content provider devices 104, user devices 102, data sources 120, content computing service 106, etc.), and evaluate the information with one or more machine learning techniques and/or statistical models to generate the availability strategy. One type of information can include performance data associated with the content item(s) of a content provider. The performance data, for example, can indicate the number of minutes streamed by users, the number of ad impressions, the number of purchases/rentals, etc. In some embodiments, the performance data may be indicated (or obtained) for each content item, for each geographical region, for each day, and/or for any time period. The content delivery component 114 may monitor consumption of content or access to content by one or more users (e.g., via user devices 102) and generate the performance data. The performance data may be stored in a storage location accessible to the content computing service 106.

Another type of information can include metadata associated with the content item. The metadata, for example, can include content description, content length, content genre, etc. In one particular example, assuming content is video content, the metadata can include a list of actors in the video content, a list of scenes, etc. In one embodiment, the content metadata may be provided by the content providers, e.g., within the availability information that is sent from the content providers to the content computing service 106. In another embodiment, the content computing service 106 may obtain the content metadata from data sources 120. The data sources 120, for example, can include information content databases, other content computing services, etc. Other types of information can include market trends (e.g., user viewing habits and preferences within a geographical region), content rankings, content ratings, content reviews, etc.

Once an availability strategy is generated, the prediction component 110 can provide an indication of the availability strategy for each content item on a user interface of the content provider device 104. The prediction component 110 can enable content providers to opt into a given availability strategy (e.g., with a single click). For example, a prompt may be presented on the user interface allowing the content provider to select or de-select the recommended availability strategy. Assuming a content provider opts into an availability strategy (e.g., by selecting the prompt), the prediction component 110 can update the content catalog 114 to make the respective content item available to users according to the availability strategy.

Note that while FIG. 1 depicts the content computing service 106 with a single content manager 108, content catalog 112, and content delivery component 114, in some embodiments, the content computing service 106 may include multiple content managers 108, content catalogs 112, and content delivery components 114. Similarly, although FIG. 1 depicts the content manager 108, content catalog 112, and content delivery component 114 as being within a single computing system, the content manager(s) 108, content catalogu(s) 112, and/or content delivery component(s) 114 may be distributed across multiple computing systems within the content computing service 106.

Figure 2:
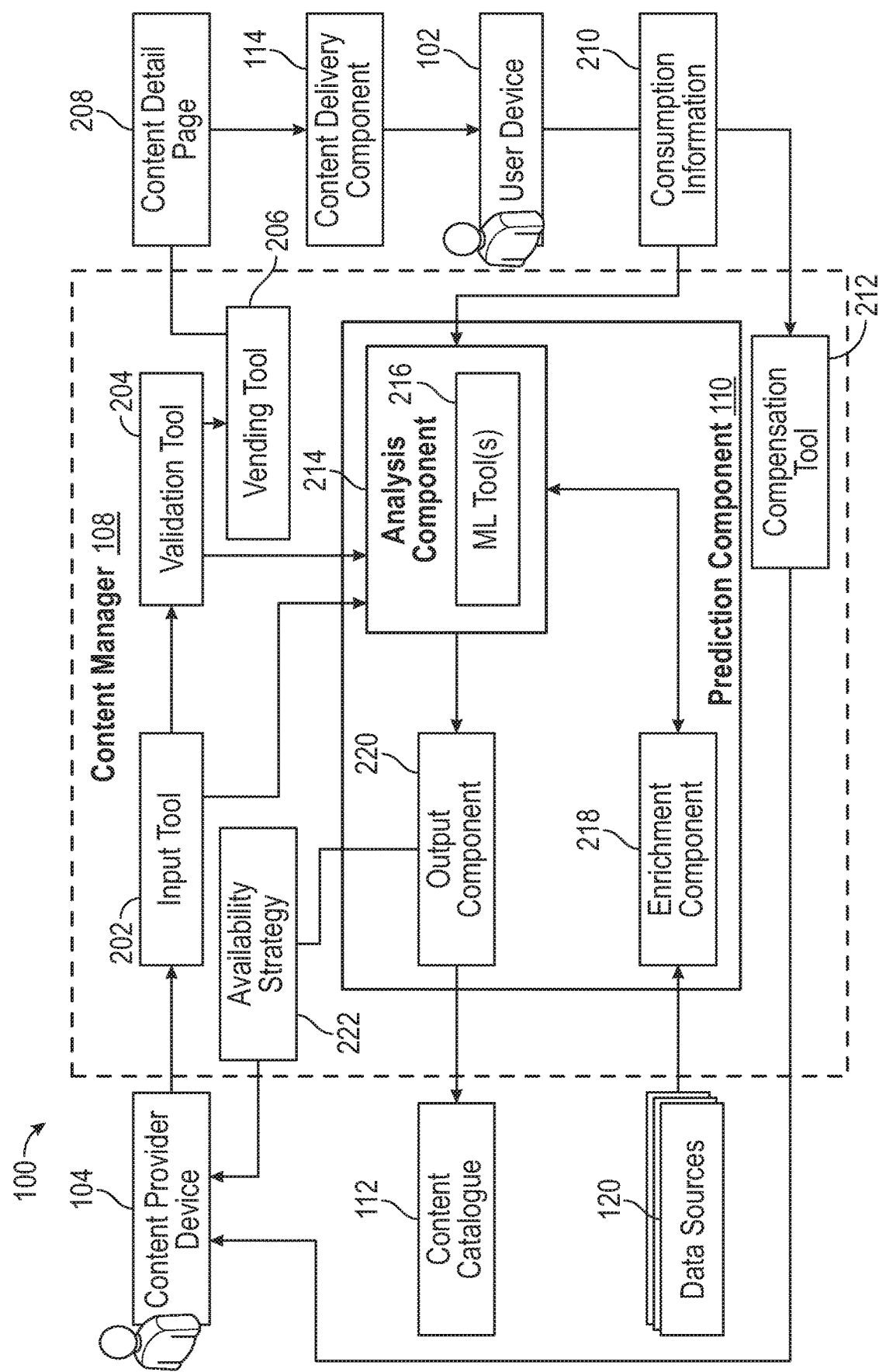
FIG. 2 is a block diagram further illustrating components of the content service platform illustrated in FIG. 1, according to one embodiment.

FIG. 2 is a block diagram further illustrating components of the content computing service 106, described relative to FIG. 1, according to one embodiment. In this particular embodiment, a content provider can access the content computing service 106 via the content provider device 104. For example, the content provider device 104 may include one or more components of a client server application (or other distributed application) (not shown) which can communicate with the content computing service 106. In some cases, the application may be a "thin" client where the processing is largely directed by the application, but performed by computing systems (e.g., content manager 108) of the content computing service 106 or a conventional software application installed on the content provider device 104. In some examples, the content provider can use a web browser (not shown) of the content provider device 104 to access the content computing service 106.

Here, the content provider can use the content provider device 104 to provide availability information for one or more content items to the content manager 108, e.g., in order to make the one or more content items available to users via the content computing service 106. As shown, the content manager 108 includes an input tool 202, a validation tool 204, a vending tool 208, the prediction component 110, and a compensation tool 212. The input tool 202 may allow the content provider to indicate availability information for one or more content items and/or allows the content provider to send (or upload) the one or content items to the content computing service 106. In one embodiment, the content provider can issue an application programming interface (API) call to the input tool 202, passing the availability information. The availability information may include identifying information of the one or more content items, content metadata, rights information for the one or more content items, conditions of the content provider (e.g., at least one of a desired location, time, offer type, and value model) for the one or more content items, etc.

The input tool 202 may forward the availability information to the validation tool 204, which is configured to verify and validate the rights information indicated in the availability information. The validation tool 204 can generate a set of offers (also referred to herein as "offer terms") for making the one or more content items available to users, based on evaluation of the indicated availability information and the rights information. In one embodiment, the set of offers represents a global set of availability strategies (e.g., offer types, value models, and geographical regions) of what can be recommended to the content provider, based on the content provider's rights to the content. For example, if the availability information indicates that the content provider has streaming rights to a content item in a particular country, the set of offers may indicate that a streaming offer type for the content item in that country is available.

The validation tool 204 can provide the set of offers to the vending tool 206, which is configured to generate and/or update a content detail page 208, based on the set of offers. The content detail page 208, for example, may indicate to a user how a given content item from a content provider can be accessed. As a reference example, a first content detail page for a first video title may indicate that the first video title is available for streaming in the United States, a second content detail page for a second video title may indicate that the second video title is available for purchase in Mexico, a third content detail page for a third video title may indicate that the third video title is available for rent, for purchase, and/or for free with ad content in North America, and so on. As shown, the content detail page 208 may be made available to users (e.g., on a user interface of the user device 102) via the content delivery component 114.

The user device 102 and/or the content delivery component 114 may monitor the user's access to content items (e.g., in the content catalogue 112 via the content delivery component 114) and generate consumption information 210 indicating how the user's accessed content items. In general, the consumption information 210 can indicate, for each content item, how often it was accessed (or consumed) by a user, the form in which it was accessed, which geographical region it was accessed in, the time in which it was accessed, the length of the access, etc. The consumption information 210 is provided to the compensation tool 212, which is configured to determine an amount of payment to provide to the content provider, based on the consumption information and the value model(s) associated with the various content items in the consumption information.

In embodiments described herein, the content manager 108 can use the prediction component 110 to determine an availability strategy 222 that satisfies one or more predetermined conditions for the content provider. As shown, the prediction component 110 includes an analysis component 214, an enrichment component 218, and an output component 220. In one embodiment, the analysis component 214 is configured to obtain availability information from the input tool 202, a set of offers from the validation tool 204, and consumption information 210 from the user device 102 and/or the content delivery component 114. The analysis component 214 may evaluate the information using one or more machine learning tools (or techniques) 216 and/or statistical models to determine the availability strategy 222.

In one embodiment, the analysis component 214 may use the machine learning tools 216 to identify correlations or other mathematical, statistical, or logical relationships between different combinations of offer types, geographical regions, value models, etc., and the effect on the predefined condition(s) for the content provider. The machine learning tools 216, in general, can include methods such as regression, logistic regression, decision trees, artificial neural networks, support vector machines, linear regression, nearest neighbor methods, distance based methods, naïve Bayes, linear discriminant analysis, k-nearest neighbor algorithm, etc. In one embodiment, the machine learning tools 216 can be trained over historical data, including historical compensation data, historical consumption (or performance) information, and historical availability strategies (e.g., including different combinations of offer types and value models).

Additionally, or alternatively, the analysis component 214 can use statistical methods to identify correlations between different combinations of offer types, geographical regions, value models, etc., and the effect on the predefined condition(s) for the content provider. In one embodiment, the statistical methods may be based on historical data. For example, the historical information may indicate that movie titles of a particular genre (e.g., "Horror") are associated with increased viewership during the month of October. In this example, the analysis component 214 can recommend that a content item of the same genre from a content provider be made available during this time period. In another example, the historical information may indicate that content items of a particular type are in demand by users (e.g., above a threshold) from a first geographical region, but not in demand by users from a second geographical region. In this example, the analysis component 214 can recommend that content items of that type from a content provider be made available to users in the first geographical region but not the second geographical region.

In some embodiments, the analysis component 214 can interact with an enrichment component 218 to evaluate user engagement with content item(s) of a content provider. For example, the enrichment component 218 can be configured to determine content rankings, content ratings, a number of social media mentions, etc. for content item(s) and provide such information to the analysis component 214. The enrichment component 218 can retrieve the user engagement information from one or more data sources 120. In one embodiment, the enrichment component 218 can search a content review database (e.g., data source 120A) for at least some of the user engagement information (e.g., content rankings, content reviews, etc.). In one embodiment, the enrichment component 218 can search one or more social media sites (e.g., data source 120B) for at least some of the user engagement information (e.g., a number of social media mentions). In one embodiment, the enrichment component 218 can retrieve at least some of the user engagement information from another content computing service. In some embodiments, the enrichment component 218 can implement or employ a web crawler tool to determine the user engagement information.

The analysis component 214 may provide the availability strategy 222 to the output component 220, which is configured to make the availability strategy 222 available to the content provider, e.g., via the content provider device 104. In one embodiment, the output component 220 may provide the availability strategy 222 for each content item via an API method. In one embodiment, the output component 220 can indicate the availability strategy 222 to the content provider in the form of a list that includes the offer type, geographical region(s), and value model(s) for each content item. In another embodiment, the output component 220 may provide a user interface (e.g., graphical user interface (GUI)) on a display of the content provider device 104, which displays the availability strategy 222 for each content item, and prompts the content provider to indicate whether the availability strategy 222 for a given content item is accepted. In some embodiments, the user interface may allow a content provider to accept (e.g., opt into) a given availability strategy 222 with a single click. Once the availability strategy 222 is accepted, the content provider device 104 may send updated availability information, which includes the accepted availability strategy 222, to the input tool 202. This, in turn, enables a new content detail page 208 to be generated (e.g., assuming the content item is not currently accessible via the content computing service 106) or the content detail page 208 to be updated (e.g., assuming the content item is currently accessible via the content computing service 106). In some embodiments, the output component 220 may also update the content catalogue 112, based on the availability strategy 222.

Note that FIG. 2 depicts merely a reference example of a workflow that can be used to generate (or predict) availability strategies for content on a content computing service and that other configurations of the workflow can be used. For example, one or more components of the content manager 108 may be combined into a single component or distributed across multiple components.

Figure 3:
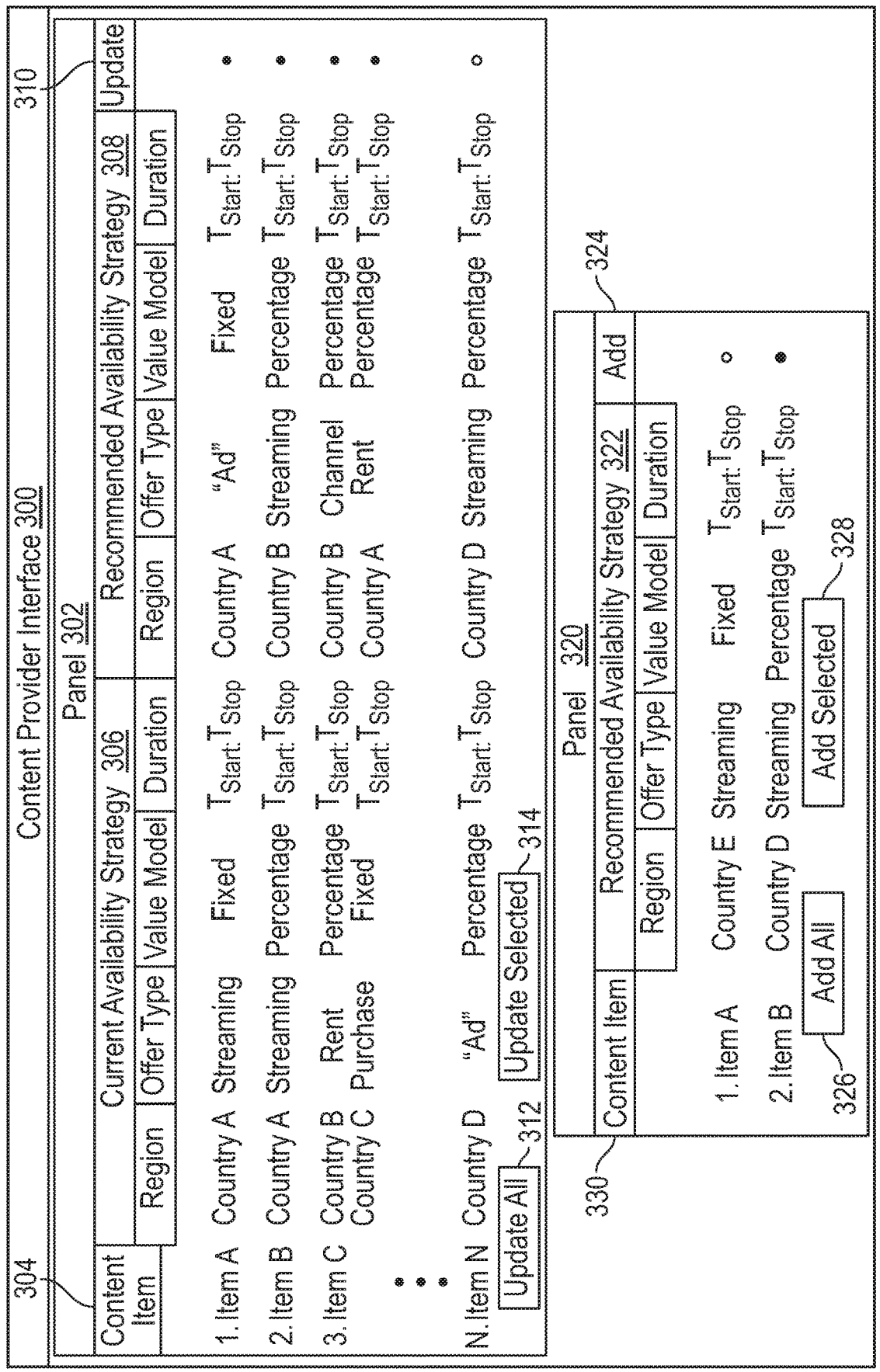
FIG. 3 depicts an example user interface for a content provider device, according to one embodiment.

FIG. 3 depicts an example user interface 300 that can be provided on a display of the content provider device 104, according to one embodiment. Note that the user interface 300 is provided as merely a reference example and other configurations of a user interface can be used to indicate availability strategies 222 for content items. In this particular example, the user interface 300 includes a panel 302 and a panel 320. In one embodiment, panel 302 is used for updating availability strategies 222 for content items (e.g., based on new information evaluated by the prediction component 110). In one embodiment, panel 304 is used for adding additional availability strategies 222 for content items.

The panel 302 includes a content item field 304, a current availability strategy field 306, a recommended availability strategy field 308, and an update field 310. Each of the current availability strategy field 306 and the recommended availability strategy field 308 includes a set of subfields, "Region," "Offer Type," "Value Model," and "Duration." The update field 310 enables the content provider to select/de-select the availability strategy in the recommended availability strategy field 308. Each content item may include one or more current availability strategies (e.g., as depicted for content item C). In one embodiment, the content provider can use the "Update All" button (or prompt) 312 to update all of the current availability strategies with the recommended availability strategies. In another embodiment, the content provider can use the "Update Selected" button 314 to update the selected current availability strategies with the corresponding recommended availability strategies. In this particular example, the content provider chooses to update the availability strategies for content items A, B, and C.

The panel 320 includes a content item field 330, a recommended availability strategy field 322 (with subfields "Region," "Offer Type," "Value Model," and "Duration"), and an add field 324. Similar to the panel 302, the add field 324 enables the content provider to select/de-select the availability strategy in the recommended availability strategy field 322. The content provider use the "Add All" button 326 to add all of the recommended availability strategies or the content provider can use the "Add Selected" button 328 to add the selected recommended availability strategies. Here, the content provider chooses to add the recommended availability strategy for content item B.

Figure 4:
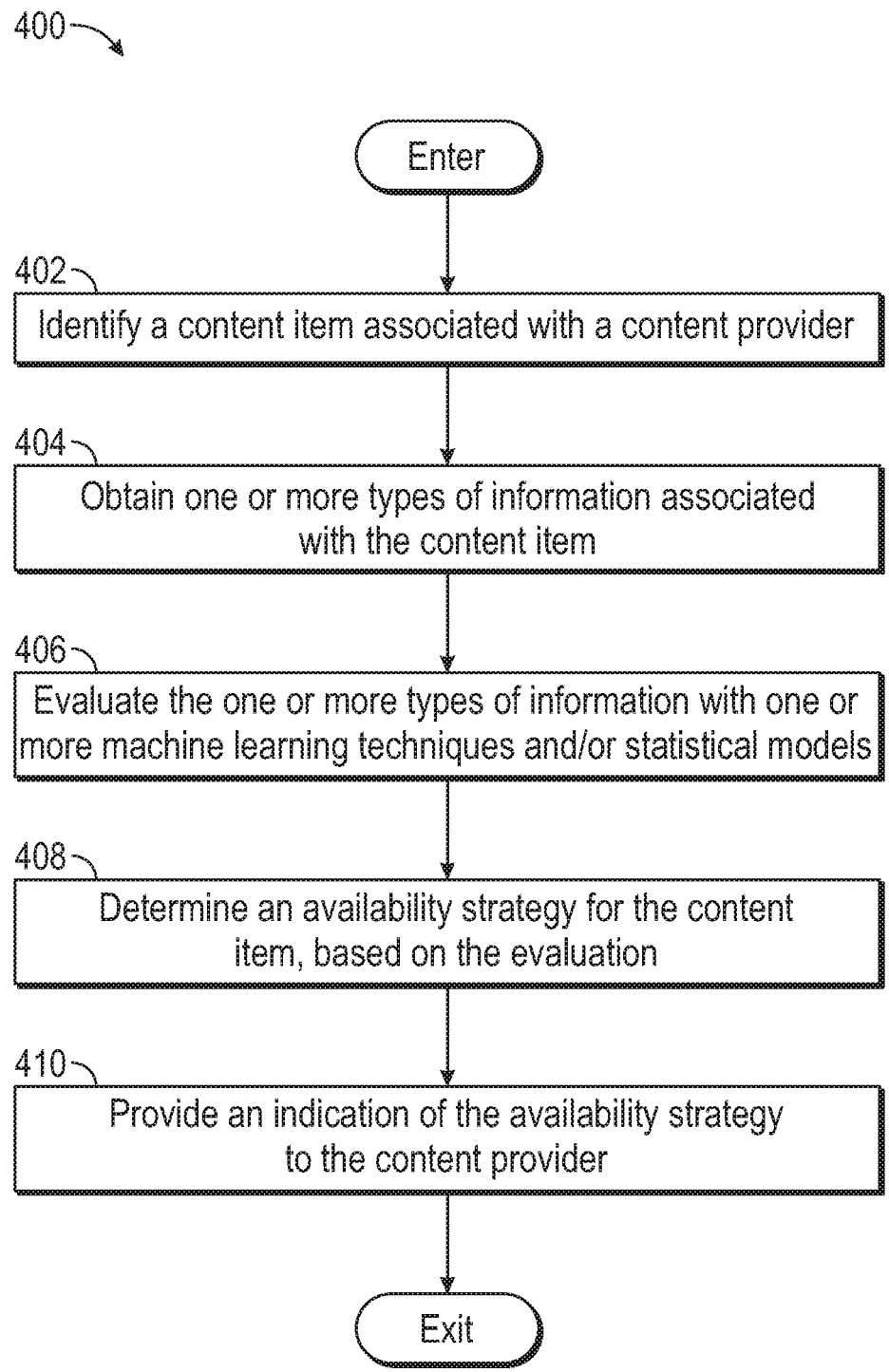
FIG. 4 is a flowchart of a method for predicting content availability strategies for one or more content items, according to one embodiment.

FIG. 4 is a flowchart of a method 400 for predicting content availability strategies for one or more content items, according to one embodiment. The method 400 may be performed by a content manager (e.g., content manager 108).

The method 400 may enter at block 402, where the content manager identifies at least one content item associated with a content provider. In one embodiment, the content manager may identify the content item from availability information received from the content provider indicating one or more content items that the content provider wants to make available to users via the content computing service. In this embodiment, the content item may be one of the content items indicated in the availability information. In another embodiment, the content manager may determine that the content item is not accessible to users via the content computing service, but is associated with another content item of the content provider that is accessible to users via the content computing service.

At block 404, the content manager obtains one or more types of information associated with the content item. The one or more types of information can include performance data (also referred to herein as consumption data), content metadata, user engagement information, market trend data, content rights information, etc. The content manager can obtain the one or more types of information from various different sources, including, for example, content providers, users, data sources 120, etc.

At block 406, the content manager evaluates the one or more types of information with one or more machine learning techniques and/or statistical models. At block 408, the content manager determines an availability strategy for the content item, based on the evaluation in block 406. As noted, the availability strategy may be associated with at least one of a geographical region, a type of access, and a value model. In some embodiments, the content manager may determine the availability strategy from multiple different availability strategies, which are generated from a set of content rights of the content provider. At block 410, the content manager provides an indication of the availability strategy to the content provider.

Figure 5:
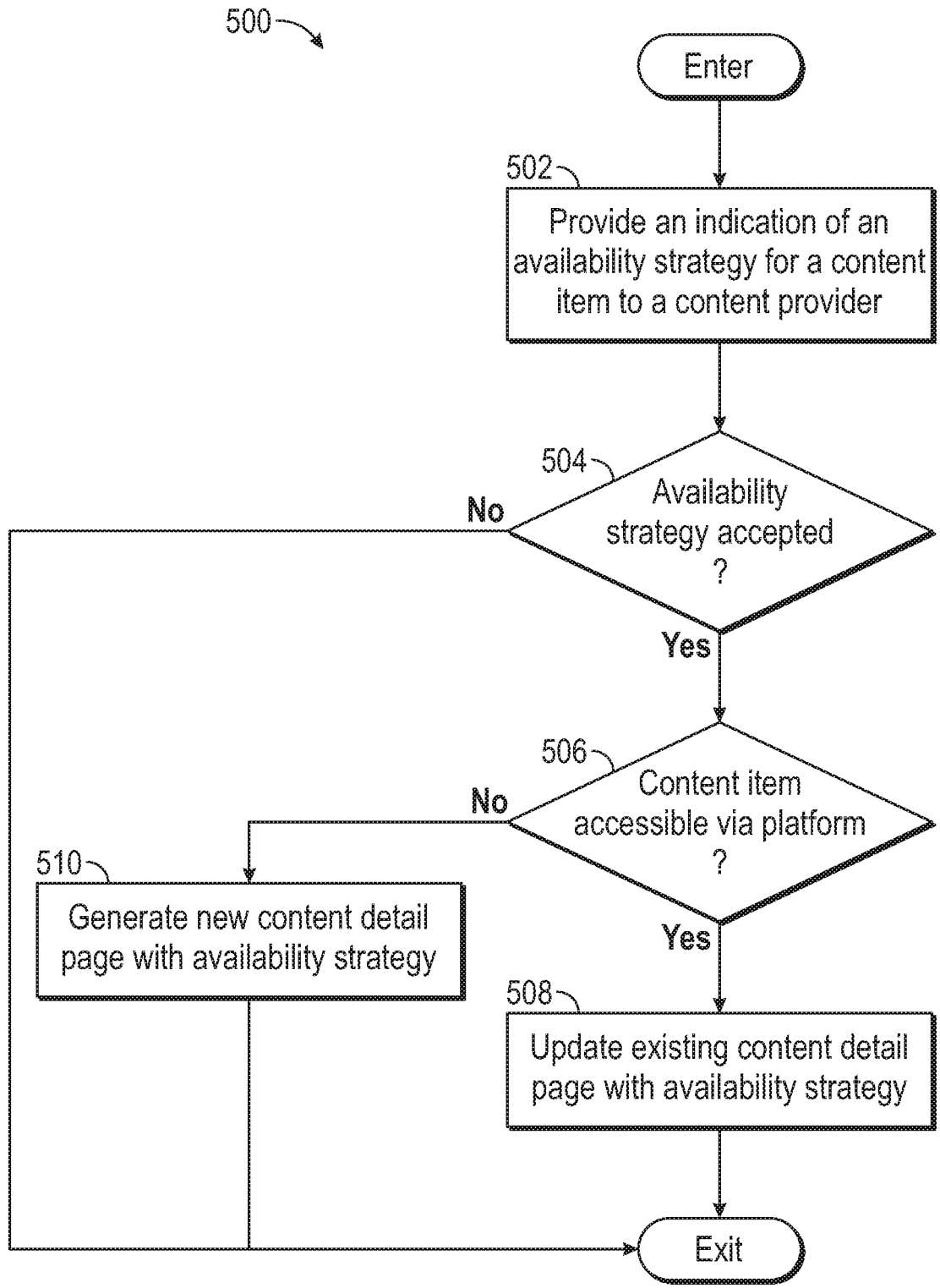
FIG. 5 is a flowchart of a method for updating an availability strategy for content on a content computing service, according to one embodiment.

FIG. 5 is a flowchart of a method 500 for updating an availability strategy for content on a content computing service, according to one embodiment. The method 500 may be performed by a content manager (e.g., content manager 108).

The method 500 may enter at block 502, where the content manager provides an indication of an availability strategy for a content item to a content provider. As noted, in some embodiments, the content manager can provide the indication by updating a user interface on a display of a content provider device (e.g., content provider device 104). In some embodiments, the content manager may provide a prompt on the user interface allowing the content provider to select/de-select the availability strategy.

At block 504, the content manager determines if the availability strategy has been accepted. For example, the content manager may determine whether the prompt on the user interface of the content provider device has been selected. If not, the content manager may refrain from taking action and the method 500 may exit. If the availability strategy has been accepted, then the content manager determines if the content item is currently accessible via the content computing service (e.g., content computing service 106) (block 506). If the content item is accessible, then the content manager updates an existing content detail page (e.g., content detail page 208) with the availability strategy (block 508). If the content item is not accessible, then the content manager generates a new content detail page for the content item that includes the availability strategy (block 510).

Figure 6:
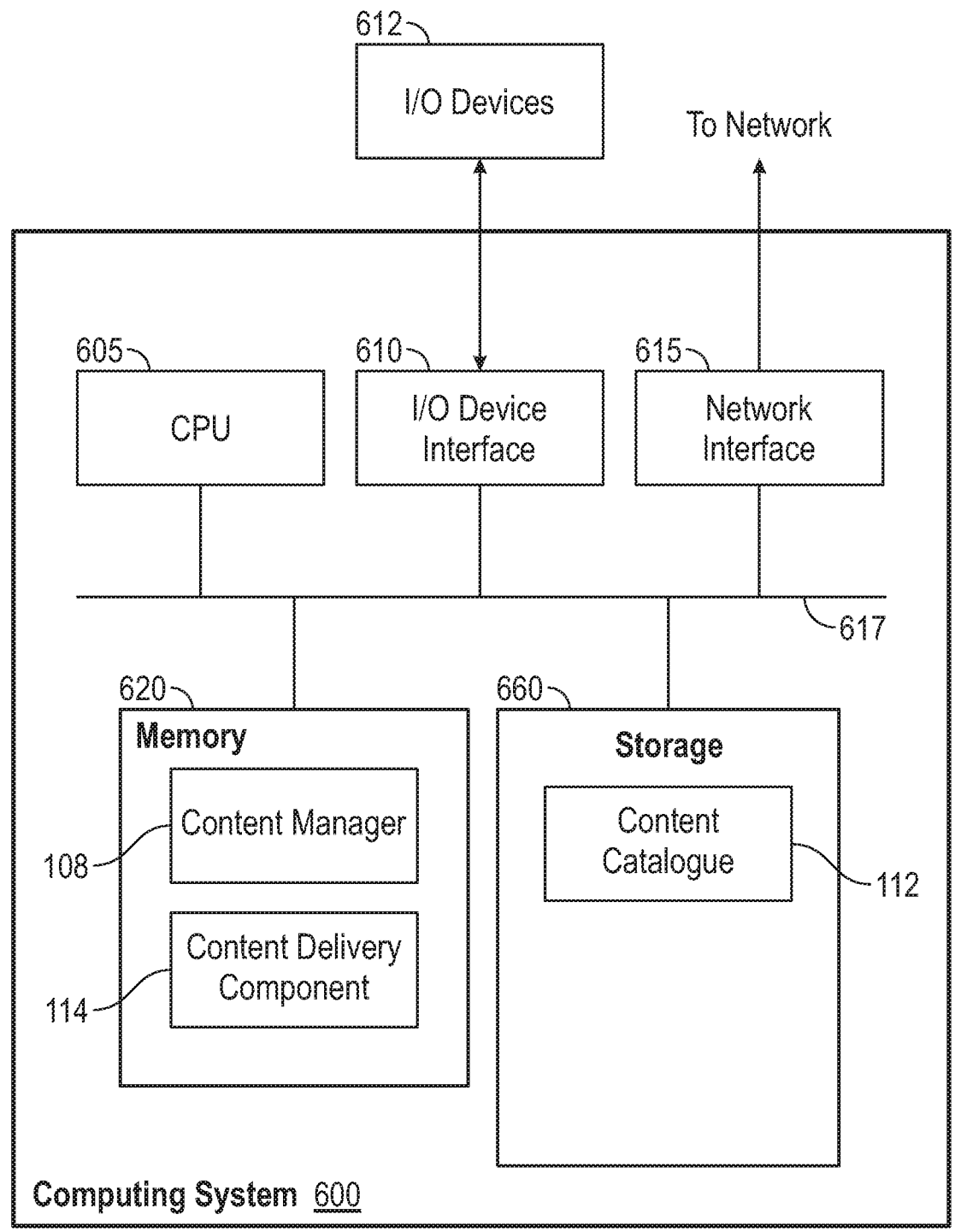
FIG. 6 illustrates a computing system configured to predict content availability strategies for one or more content items, according to one embodiment.

FIG. 6 illustrates a computing system 600 configured to predict content availability strategies for one or more content items, according to one embodiment. As shown, the computing system 600 includes, without limitation, a central processing unit (CPU) 605, a network interface 615, a memory 620, and storage 660, each connected to a bus 617. The computing system 600 may also include an I/O device interface 610 connecting I/O devices 612 (e.g., keyboard, mouse, and display devices) to the computing system 600. Further, in context of this disclosure, the computing elements shown in the computing system 600 may correspond to a physical computing system (e.g., a system in a data center) or may be a virtual computing instance executing within a computing cloud. In one embodiment, the computing system 600 can be an example of the computing system illustrated in FIG. 1 (e.g., content manager 108).

The CPU 605 retrieves and executes programming instructions stored in the memory 620 as well as stores and retrieves application data residing in the memory 620. The interconnect 617 is used to transmit programming instructions and application data between CPU 605, I/O devices interface 610, storage 660, network interface 615, and memory 620. Note CPU 605 is included to be representative of a single CPU, multiple CPUs, a single CPU having multiple processing cores, and the like. Memory 620 is generally included to be representative of a random access memory. The storage 660 may be a disk drive storage device. Although shown as a single unit, storage 660 may be a combination of fixed and/or removable storage devices, such as fixed disc drives, removable memory cards, or optical storage, network attached storage (NAS), or a storage area-network (SAN). The storage 660 includes content catalog 112, which is described in more detail above. Illustratively, the memory 620 includes the content manager 108 and the content delivery component 114, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., content manager 108, content catalogue 112, and content delivery component 114) or related data available in the cloud. For example, the content manager 108 could execute on a computing system in the cloud and generate an availability strategy for content item(s) of a content provider. In such a case, the content manager 108 could generate the availability strategy and store information associated with the availability strategy at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory storing one or more applications, which, when executed on the processor performs an operation comprising:
  determining at least one content item associated with a content provider, wherein the at least one content item is accessible to one or more users, over a communication network, according to a first availability framework, and wherein the first availability framework is associated with (i) a geographical region, (ii) a first access type of a plurality of access types comprising a streaming-based access, a rental-based access, a purchase-based access, and an advertising-supported access, and (iii) a value model;
  obtaining information associated with consumption of the at least one content item by the one or more users;
  determining, based on evaluating at least the consumption information with a machine learning model, a second availability framework for the at least one content item that satisfies one or more predetermined conditions, wherein the second availability framework is associated with a second access type, different from the first access type, from the plurality of access types comprising the streaming-based access, the rental-based access, the purchase-based access, and the advertising-supported access;
  providing an indication of the second availability framework to the content provider; and
  upon receiving, in response to the indication of the second availability framework, an indication that the content provider has accepted the second availability framework, providing an indication that the at least one content item is accessible to the one or more users, over the communication network, according to the second availability framework.

2. The system of claim 1, wherein the second availability framework is further associated with at least one of a different geographical region or a different value model than the first availability framework.

3. The system of claim 1, wherein the one or more predetermined conditions comprises a threshold number of users that access the at least one content item.

4. The system of claim 1, wherein providing an indication that the at least one content item is accessible to the one or more users over the communication network according to the second availability framework comprises updating information associated with the at least one content item with the second availability framework.

5. The system of claim 1, the operation further comprising:
receiving a set of content rights of the content provider to the at least one content item; and
determining a plurality of different availability frameworks, based on the set of content rights, wherein the second availability framework is determined from the plurality of different availability frameworks.

6. The system of claim 1, wherein the information associated with consumption comprises at least one of an amount of time that the first content item has been previously accessed over the communication network, a number of times that the first content item has been accessed over the communication network, or a number of geographical regions where the first content item has been available to users.

7. The system of claim 1, wherein the information comprises at least one of a rating of the first content item, an estimated demand for the first content item by one or more users, a number of social media mentions for the first content item, or a ranking of the first content item relative to other content items.

8. The system of claim 1, the operation further comprising:
determining a set of content rights of the content provider to the first content item; and
determining a plurality of different availability frameworks, based on the set of content rights, wherein the second availability framework is determined from the plurality of different availability frameworks.

9. A computer-implemented method, comprising:
determining at least one content item associated with a content provider, wherein the at least one content item is accessible to one or more users, over a communication network, according to a first availability framework, and wherein the first availability framework is associated with (i) a geographical region, (ii) a first access type of a plurality of access types comprising a streaming-based access, a rental-based access, a purchase-based access, and an advertising-supported access, and (iii) a value model;

obtaining information associated with consumption of the at least one content item by the one or more users;

determining, based on evaluating at least the consumption information with a machine learning model, a second availability framework for the at least one content item that satisfies one or more predetermined conditions, wherein the second availability framework is associated with a second access type, different from the first access type, from the plurality of access types comprising the streaming-based access, the rental-based access, the purchase-based access, and the advertising-supported access;

providing an indication of the second availability framework to the content provider; and upon receiving, in response to the indication of the second availability framework, an indication that the content provider has accepted the second availability framework, providing an indication that the at least one content item is accessible to the one or more users, over the communication network, according to the second availability framework.

10. The computer-implemented method of claim 9, wherein the second availability framework is further associated with at least one of a different geographical region or a different value model than the first availability framework.

11. The computer-implemented method of claim 9, wherein the one or more predetermined conditions comprises a threshold number of users that access the at least one content item.

12. The computer-implemented method of claim 9, wherein providing an indication that the at least one content item is accessible to the one or more users over the communication network according to the second availability framework comprises updating information associated with the at least one content item with the second availability framework.

13. The computer-implemented method of claim 9, the method further comprising:
receiving a set of content rights of the content provider to the at least one content item; and
determining a plurality of different availability frameworks, based on the set of content rights, wherein the second availability framework is determined from the plurality of different availability frameworks.

14. The computer-implemented method of claim 9, wherein the information associated with consumption comprises at least one of an amount of time that the first content item has been previously accessed over the communication network, a number of times that the first content item has been accessed over the communication network, or a number of geographical regions where the first content item has been available to users.

15. The computer-implemented method of claim 9, wherein the information comprises at least one of a rating of the first content item, an estimated demand for the first content item by one or more users, a number of social media mentions for the first content item, or a ranking of the first content item relative to other content items.

16. The computer-implemented method of claim 9, further comprising:
determining a set of content rights of the content provider to the first content item; and
determining a plurality of different availability frameworks, based on the set of content rights, wherein the second availability framework is determined from the plurality of different availability frameworks.

17. A computer-readable storage medium storing instructions, which, when executed on one or more computing systems, perform an operation comprising:
determining at least one content item associated with a content provider, wherein the at least one content item is accessible to one or more users, over a communication network, according to a first availability framework, and wherein the first availability framework is associated with (i) a geographical region, (ii) a first access type of a plurality of access types comprising a streaming-based access, a rental-based access, a purchase-based access, and an advertising-supported access, and (iii) a value model;

obtaining information associated with consumption of the at least one content item by the one or more users;

determining, based on evaluating at least the consumption information with a machine learning model, a second availability framework for the at least one content item that satisfies one or more predetermined conditions, wherein the second availability framework is associated with a second access type, different from the first access type, from the plurality of access types comprising the streaming-based access, the rental-based access, the purchase-based access, and the advertising-supported access;

providing an indication of the second availability framework to the content provider; and upon receiving, in response to the indication of the second availability framework, an indication that the content provider has accepted the second availability framework, providing an indication that the at least one content item is accessible to the one or more users, over the communication network, according to the second availability framework.

18. The computer-readable storage medium of claim 17, wherein the information comprises at least one of: (i) an amount of time that the first content item has been previously accessed over the communication network, (ii) a number of times that the first content item has been accessed over the communication network, (iii) a number of geographical regions where the first content item has been available to users, (iv) a rating of the first content item, (v) an estimated demand for the first content item by one or more users, a number of social media mentions for the first content item, and (vi) a ranking of the first content item relative to other content items.

19. The computer-readable storage medium of claim 18, wherein the operation further comprising:
determining a set of content rights of the content provider to the first content item; and
determining a plurality of different availability frameworks, based on the set of content rights, wherein the second availability framework is determined from the plurality of different availability frameworks.

* * * * *